United States Patent
Buchert

(10) Patent No.: US 11,046,891 B2
(45) Date of Patent: Jun. 29, 2021

(54) METHOD OF RECYCLING WASTE PLASTIC MATERIAL

(71) Applicant: Jürgen Buchert, Schweinfurt (DE)

(72) Inventor: Jürgen Buchert, Schweinfurt (DE)

(73) Assignee: Jürgen Buchest, Schweinfurt (DE)

( * ) Notice: Subject to any disclaimer, the term of this patent is extended or adjusted under 35 U.S.C. 154(b) by 0 days.

(21) Appl. No.: 16/517,870

(22) Filed: Jul. 22, 2019

(65) Prior Publication Data

US 2021/0024832 A1  Jan. 28, 2021

(51) Int. Cl.
| | | |
|---|---|---|
| *C10G 1/10* | (2006.01) | |
| *C10G 15/08* | (2006.01) | |
| *C10G 11/02* | (2006.01) | |
| *C10L 1/08* | (2006.01) | |
| *F02C 3/24* | (2006.01) | |
| *F26B 3/02* | (2006.01) | |
| *F26B 23/00* | (2006.01) | |
| *C10G 33/00* | (2006.01) | |

(52) U.S. Cl.
CPC ................ *C10G 1/10* (2013.01); *C10G 11/02* (2013.01); *C10G 15/08* (2013.01); *C10G 33/00* (2013.01); *C10L 1/08* (2013.01); *F02C 3/24* (2013.01); *F26B 3/02* (2013.01); *F26B 23/001* (2013.01); *C10G 2300/1003* (2013.01); *C10G 2300/70* (2013.01); *C10G 2400/04* (2013.01); *C10L 2200/0461* (2013.01); *C10L 2270/026* (2013.01); *C10L 2270/04* (2013.01); *C10L 2290/06* (2013.01); *C10L 2290/08* (2013.01); *C10L 2290/28* (2013.01); *C10L 2290/34* (2013.01)

(58) Field of Classification Search
CPC . C10G 1/10; C10G 11/02; C10G 3/00; C10G 1/00; C10L 1/06; C10L 1/08
See application file for complete search history.

(56) References Cited

U.S. PATENT DOCUMENTS

| | | |
|---|---|---|
| 7,799,960 B2 | 9/2010 | Buchert |
| 7,803,333 B2 | 9/2010 | Buchert |
| 7,947,858 B2 | 5/2011 | Buchert |
| 8,722,948 B2 | 5/2014 | Buchert |

(Continued)

OTHER PUBLICATIONS

Mahon (Microplastics in sewage sludge: Effect of treatment, 2017, Environmental Science and Technology, vol. 51, pp. 810-818). (Year: 2017).*

*Primary Examiner* — Youngsul Jeong
(74) *Attorney, Agent, or Firm* — Henry M. Feiereisen LLC

(57) ABSTRACT

In a method for thermal processing of catalytically active waste plastics mixture, the mixture is subjected in a receiving tank to a cracking temperature to undergo a cracking reaction. The mixture is transferred to a mixer pump to produce a reaction mixture which is directed into an outgassing chamber of an intermediate tank to produce an outgassed fraction and a non-outgassed liquid fraction. The outgassed fraction to produce fuel is cooled down, and a first portion of the non-outgassed liquid fraction is returned and subjected again to the cracking temperature in the receiving tank. A second portion of the non-outgassed liquid fraction is conducted in a bypass to the outgassing chamber of the intermediate tank for outgassing while fresh mixture is added. Residual matter settling in the intermediate tank is periodically removed.

9 Claims, 1 Drawing Sheet

(56) References Cited

U.S. PATENT DOCUMENTS

| | | |
|---|---|---|
| 8,728,416 B2 | 5/2014 | Buchert |
| 2008/0148628 A1* | 6/2008 | Buchert ................. C02F 11/10 44/311 |
| 2008/0153365 A1 | 6/2008 | Buchert |
| 2009/0151233 A1* | 6/2009 | Miller .................... C10G 69/02 44/307 |
| 2013/0153394 A1* | 6/2013 | Wieser-linhart ......... C10G 1/10 201/4 |

\* cited by examiner

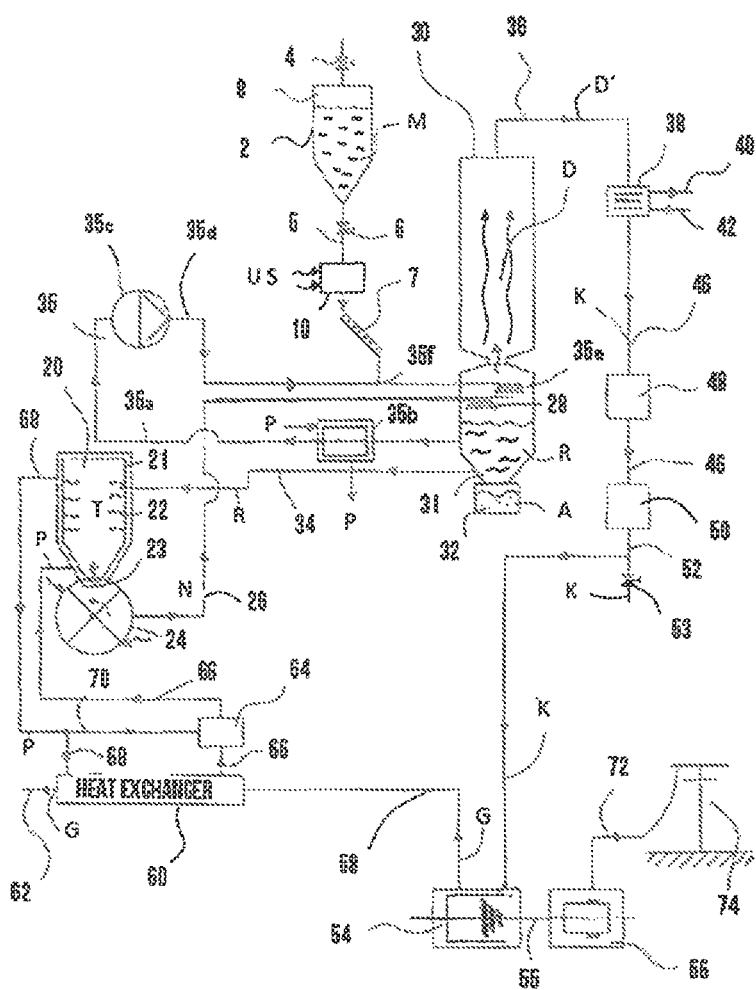

METHOD OF RECYCLING WASTE PLASTIC MATERIAL

BACKGROUND OF THE INVENTION

The present invention relates to a method for processing certain waste plastic material into burnable fuel by thermally processing the waste plastics together with a biocatalyst.

Nothing in the following discussion of the state of the art is to be construed as an admission of prior art.

Widespread use of plastics has surpassed all other man-made materials except steel and cement. Global production of plastic increased from 2 million tons in 1950 to 380 million tons by 2015, a growth rate 2.5 greater than that of the global economy. Half of that amount was produced in just the last 13 years.

As a material, plastic is long lasting and durable and does not degrade in a short period of time. This is one of the reasons plastic can be so useful when it comes to human health and food safety—especially in the developing world. But this also means that plastics accumulate in the natural environment and landfills.

The world has a waste plastic problem. According to the United Nations, upward of 8 million tons of waste plastics makes its way into the oceans each year. Exactly how you get rid of this has been the subject of plenty of efforts.

From poisoning and injuring marine life to disrupting human hormones, from littering our beaches and landscapes to clogging our waste streams and landfills, the exponential growth of plastics is now threatening our planet.

Efforts have focused on everything from reducing the use of plastics in packaging to using drones to help spot plastic-clogged waterways from the sky. More and more cities are banning single-use plastic grocery bags because they represent a large volume of slow-to-decompose landfill waste as well as contribute to a considerable amount of pollution.

Many efforts go to recycling plastic waste, but there are certain waste plastics that cannot be economically recycled and by necessity becomes landfill.

Six different types of plastic (polyethylene (PE), polypropylene (PP), polystyrene (PS), polyvinylchloride (PVC), polyethylene terephthalates (PET), and polyurethane (PUR) account for 92% of all the plastics ever made and 42% of that has been used for packaging, generally with a lifespan of less than 1 year before being discarded A method is described here to convert polymers like polyolefins into useful products, for example, fuel. These polyolefins include High-Density Polyethylene (HDPE), Low-Density Polyethylene LDPE and LLDPE, and Polypropylene PP and others; non-polyolefins like poly ethyleneterephthalate (PETP), polybutyleneterephthalate (PBT), polystyrene (PS) and others also called "engineering plastics".

LDPE—this density of polyethylene is ductile and used to make products like shopping bags, plastic bags, clear food containers, disposable packaging, and similar. HDPE is more rigid than both LDPE and MDPE. HDPE plastic sheeting is in products such as plastic bottles, piping for water and sewer, snowboards, boats, and folding chairs. PP is the second most used polymer in the world. Its widespread use and popularity are undoubted because polypropylene is one of the most flexible thermoplastics on the planet. Although PP is stronger than PE, it still retains flexibility. It will not crack under repeated stress. Durable, flexible, heat resistant, acid resistance, and cheap. It is hard to crack the polymer under repeated stress. PETP/PETB are the most thermoplastic polymers of the polyester family. They are the fourth-most produced synthetic plastics. They have excellent chemical resistance and resist environmental influences. Polyethyleneterephthalate has excellent chemical resistance to environmental influences, it is practically shatterproof and possesses an impressive high strength to weight ratio. This plastic material is in fibers for clothing, containers for foods and liquid, glass fiber for engineering resins, carbon nanotubes, and many other products that we use on a daily basis.

These plastics that are mostly destined for landfill can now be recycled to be delivered for processing into a fuel.

To ensure clarity, it is necessary to establish the definition of several important terms and expressions that will be used throughout this disclosure.

The term "recycling" is used for methods that allow plastic waste to be degraded into biodegradable constituents to be transformed into different useful products such as fuel. "Waste plastics" includes all types of plastics discarded from consumer goods or from industrial operations. The term "waste plastic" is used here in a generic sense and may refer to a mixture of waste plastics that are suitable for recycling and involves plastic of the type as afore-described.

"Biocatalyst" is a relatively dry catalytically active biomass substance ("biocatalyst") and is a waste product from agriculture such as husks or grain tegument. Biocatalyst, alone or together with the waste plastics should have a moisture content of approximately 2-5%. Biocatalyst may be obtained in large amounts in agriculture.

The term "biocatalyst" involves predominantly bio-substances which take up a certain amount of catalytically active elements, minerals or other compositions present in the ground, as they grow. It has been shown that, e.g., a certain content of inorganic substances have a catalytic effect when mixed with waste plastic for a catalytic cracking. These types of bio-substances with mineral constituents involve, especially rice husks but also rapeseed roots, rapeseed straw, or sugar beet residues fall into that category. Rice husks have shown to have a larger amount of catalytically effective inorganic residue (ash) and hence are suitable for the cracking of waste plastic.

The method according to the present invention is specifically designed to recycle plastics material that is comprised of waste plastics such as for example plastic bags, plastic containers of all types that goes to waste and which is not biodegradable in the soil without prior chemical degradation. Such plastics material is amassed in daily waste and accumulates for example in city sewers and oceans where this plastics material represents an ecological problem.

It would be desirable and advantageous to provide an improved method for recycling waste plastics in a processing cycle to include biocatalyst to obviate prior art shortcomings.

SUMMARY OF THE INVENTION

According to one aspect of the present invention, a method of thermal processing of waste plastics with catalytically active biocatalyst includes the steps of subjecting a mixture of waste plastics and catalytically active biocatalyst in a receiving tank to a cracking temperature to undergo a cracking reaction, then directing the reaction mixture into an outgassing chamber of an intermediate tank to produce an outgassed fraction and a non-outgassed liquid fraction, cooling down the outgassed fraction to produce fuel, returning a first portion of the non-outgassed liquid fraction and subjecting it again to the cracking temperature in the receiving tank, and conducting a second portion of the non-outgassed liquid fraction in a bypass to the outgassing chamber of the intermediate tank for outgassing while fresh plastic/biocatalyst mixture is added, and periodically removing from the intermediate tank settled residual matter.

The present invention is based on the recognition to use a catalytically active biocatalyst to trigger a catalytic process when exposed to heat and thereby cause a substantial cracking of large chain polymers of hydrocarbons. The thermal and catalytic effect depends on the biocatalyst composition which may vary to be rice husks or other husks. Still, it has been found that the biocatalyst can react such that the plastic polymers are catalytically cracked.

According to another feature of the present invention, the biocatalyst/plastic mixture may be transferred to a mixer pump. There it may be subjected to a further cracking reaction in the mixer pump.

According to another feature of the present invention, the cracking temperature may range from 280° C. to 360° C.

According to another feature of the present invention, the resulting fuel may be dewatered and/or desulfurized. Fuel can then be used for drive motors, e.g. diesel motors. It is also possible to use fuel for generating electricity, for example with the aid of a turbogenerator (combination of turbine and generator). Fuel may also be combusted in a turbine for driving a generator, while exhaust gas from the turbine can be used for generating the cracking temperature. This is financially beneficial. The exhaust gas may thus be used as an energy source heating a thermal oil circulation reaching the cracking temperature. Thermal oil may hereby be supplied to the receiving tank and/or a post-heating unit.

Normally, the portion of plastic is greater than the portion of biocatalyst.

The method according to the present invention is thus able to dispose in addition to biocatalyst also biological residue which both are difficult to recycle. The proportion of fuel being generated is substantial, while the proportion of gas and low-boiling fractions is relatively small. The energy content of fuel can be exploited for generating electricity and/or heat for a wide range of applications and also for operating motors.

According to another aspect of the present invention, an apparatus for thermal processing of catalytically active mixture includes a reservoir for accepting a waste plastics mixture, a transport device associated to an outlet of the reservoir, a receiving tank for heating the mixture to a cracking temperature to thereby trigger a catalytic cracking reaction, a mixing pump disposed downstream of the receiving tank to receive the mixture from the receiving tank, an intermediate tank having an outgassing chamber, an outgassing device accommodated in the intermediate tank, a distillation column disposed downstream of the intermediate tank, a feed line fluidly connecting an outlet of the mixer pump to the outgassing device, a return line extending between a lower part of the intermediate tank and the receiving tank for returning a non-outgassed fraction of the mixture, a condenser fluidly connected to a top of the distillation column for cooling an outgassed vaporized fraction of the mixture to thereby produce fuel, said condenser having an outlet for discharge of the fuel, and a bypass living a bypass puma and extending between the lower part of the intermediate tank and the outgassing chamber of the intermediate tank, said bypass having a port in communication with an outlet of the transport device for introduction of biocatalyst together with waste plastic.

According to another feature of the present invention, a processing device may be disposed downstream of tie outlet of the condenser, for dewatering the fuel. Suitably, a storage tank may be fluidly connected to the condenser for collecting the purified product.

According to another feature of the present invention, the receiving tank may have a double-jacketed configuration for circulation of hot thermal oil. Suitably, the thermal oil has a temperature which is adjusted to closely reach the cracking temperature. The receiving tank may hereby be part of a circulation system for the thermal oil, with the circulation system further including a heat exchanger.

According to another feature of the present invention, the bypass may include a post-heating unit.

According to another feature of the present invention, produced fuel may be supplied from the condenser to a turbine. Exhausts from the turbine can be conducted to the heat exchanger for utilizing the energy content. The turbine may also be operatively connected to a generator which may be connected to the public power grid.

According to another feature of the present invention, an ultrasound device may be disposed between the reservoir and the transport device for exposing the waste plastic mixture to ultrasound before undergoing the cracking reaction. The waste plastics mixture may hereby include biocatalyst and/or biological residue

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a schematic illustration of one embodiment of an apparatus for thermal processing of waste plastic mixture in accordance with the present invention.

DETAILED DESCRIPTION OF PREFERRED EMBODIMENTS

The depicted embodiment is to be understood as illustrative of the invention and not as limiting in any way. It should also be understood that the FIGURE is not necessarily to scale. Details which are not necessary for an understanding of the present invention or which render other details difficult to perceive may have been omitted.

Turning now to the sole FIGURE, there is shown, by way of example, a schematic illustration of one embodiment of an apparatus for thermal processing of waste plastic mixture in accordance with the present invention.

The apparatus includes a reservoir 2 having a closeable inlet 4 for accepting finely particulate and rather dry and catalytically active waste plastic mixture P. The waste plastic mixture P is a mixture to contain about 70% by weight waste plastic and about 25-30% by weight of rice husks as biocatalyst for producing as much diesel oil based fuel K as possible. Water content should be low, to approximately 5% by weight. The mixture is comminuted to a granular size of approximately 2 mm.

Arranged at the lower end of the reservoir 2 is a metering valve 6, e.g. a controllable supply unit, which is connected to a transport device 7 or worm for routing the waste plastic mixture P from the reservoir 2 along a conduit 5. Inside the reservoir 2 above the waste plastic mixture P level is a nitrogen cushion 8 or a cushion of different inert gas under pressure. This prevents air, i.e. oxygen, from penetrating the apparatus. The introduction of catalytically active waste plastic P into the apparatus will be described further below.

The catalytically active waste plastic mixture P is made from a mixture of waste plastic and biocatalyst.

The apparatus further includes a receiving tank 20 having a double-jacketed configuration so as to define a passageway 21 which is part of a thermal oil heat circulation for circulating thermal oil O and heating the plastic mixture P to a cracking temperature T ranging from about 280° C. to about 360° C. Introduction of heat is indicated by arrows 22. The heat transfer to P is provided by thermal oil. An example of thermal oil includes Meganol 420. As a result of the elevated temperature T in the receiving tank 20, organic molecules of the plastic mixture P are subjected to a thermal cracking process. Substances in the, plastic mixture P in particular mineral fractions of the biocatalyst, act hereby as catalyst for the cracking reaction. After undergoing the thermal cracking process, a liquid reaction mixture N, in which the previously present substances have been broken down to a large extent as a consequence of the catalytic and thermal cracking process, exits the tank 20 via an outlet 23.

Connected to the lower end of the receiving tank 20 is a mixer pump 24 which subjects the liquid reaction mixture N from the receiving tank 20 to a further cracking reaction. The mixer pump 24 rotates counterclockwise, as indicated by the curved arrow, and has two functions: On one hand, the mixer pump 24 assists a thorough mixing of the reaction mixture N exiting the tank 20 and resulting from the plastic mass mixture P and on the other hand, the mixer pump 24 effects a shearing of particles in the reaction mixture N so that the surface is enlarged and efficiency increased.

The mixer pump 24 may be constructed as a heating unit. The added heating through shearing and/or friction is indicated by the wavy arrows.

The mixer pump 24 is connected to a feed line 26 which is part of a reaction circulation and leads to an outgassing device 28 which is accommodated in an outgassing chamber of an intermediate tank 31 and provided to separate water vapor and organic vapor D from a non-outgassed liquid residue R of the reaction mixture N. The intermediate tank 31 is arranged anteriorly of a distillation column 30 which receives the water vapor and the organic vapor D. The liquid residue R collects in a lower portion of the intermediate tank 31 and eventually settles upon the bottom of the intermediate tank 31 as residual matter A for discharge in a collecting vessel 32 and ultimate storage or optional use as combustible. Extending from the lower portion of the intermediate tank 31 is a conduit 34 for feeding a first portion of the liquid residues R that have not been distilled as of yet back to the receiving tank 20. The conduit 34 of the intermediate tank 31 thus represents a return line of the reaction circulation.

The mixer pump 24 thus repeatedly feeds liquid reaction mixture N, obtained from the plastic mass mixture P, in the reaction circulation comprised of mixer pump 24, feed line 26, outgassing device 28, intermediate tank 31, conduit 34, receiving tank 20, until substantially all organic substances have been thermally cracked and conducted upwards and until residual matter A has been separated out. In order to initiate the reaction circulation, a high-boiling product from the process or thermal oil should be introduced. In other words, the reaction process R commences when the product R from the intermediate tank 31 is in hot liquid form or when the thermal oil is added to the mixture N via the conduit 34.

To ensure a continuous operation, small amounts of plastic mixture P are transferred by the transport device 7 to a bypass 35. The presence of the bypass 35 is instrumental to prevent or at least reduce foam formation in the Intermediate tank 31. The bypass 35 includes a return line 35 which extends from the lower part of the intermediate tank 31, an optional double-jacketed post-heating unit 35b which defines a passageway for circulation of heated thermal oil P, a bypass pump 35, and a feed line 35d which ends in an outgassing device 35e disposed in the upper part of the intermediate tank 31 above the level of the product R, i.e. in the outgassing chamber. The outlet of the transport device 7 connects to a port 35f of the feed line 35d. The volume introduced per time unit from the transport device 7 is substantially smaller than the volume transported by the bypass pump 35c per time unit and amounts to only 5%, for example.

A second portion of the residue R is drawn via the return line 35a by the pump 35c. Plastic mass P, which is still relatively cold, is fed via the port 35f and heated by the residue R flowing in the feed line 35d to an elevated temperature, even up to the reaction temperature T. All water is hereby converted into water vapor which flows upwards in the intermediate tank 31 towards the distillation column 30 and then to the condenser 38 for subsequent discharge together with fuel K and optional separation from the fuel K by means of a centrifuge, for example.

Low-boiling organic vapor D' is separated within the distillation column from atop the distillation column 30 and drained through a drain line 36 which connects to a condenser 38. The outgassed organic vapor fraction D' is cooled down in the condenser 38 and discharged in the form of liquid fuel K through a fuel drain line 46. The fuel K maybe similar, e.g., to diesel oil. Reference numerals 40 and 42 designate coolant lines of the condenser 38, with coolant line 40 constituting a coolant feed line and coolant line 42 constituting a coolant drain line. The fuel drain line 46 connects the condenser 38 with a processing device 48 for processing the fuel K, e.g. for dewatering the fuel K and removal of water, or for desulphurization, and subsequently to a downstream storage tank 50. The storage tank 50 has an outlet line 52 via which the fuel K can be optionally supplied to a fuel-operated system, for example a drive motor.

In the non-limiting example of the FIGURE, the fuel-operated system involves a turbine generator which includes a turbine 54 and an electric generator 56 which is operatively connected to the turbine 54 by a shaft 55. The turbine generator is used for generating electricity as well as for generating the cracking temperature T via the thermal oil circulation. Fuel K is conducted via the fuel outlet line 52 from the storage tank 50 to the turbine 54 and combusted to thereby drive the electric generator 56. As the fuel K is combusted in the turbine 54, exhaust gas G is produced which is conducted via an exhaust line 58 to a heat exchanger 60 and cooled down as it interacts with thermal oil P of the thermal oil circulation. As a result, thermal oil Q is heated up and returned via a feed line 66 to the passageway 21 of the receiving tank 20 for heating the mixture P. The cooled down exhaust gas G leaves the heat exchanger 60 via outlet line 62 and may also be used for crying the Introduced waste plastic mixture.

The heat exchanger 60 is thus also part of the thermal oil circulation, shown only schematically A temperature controller 64 maintains the thermal oil P in the feed line 66 at a predefined temperature close to the cracking temperature T, e.g. to 360° C. As it enters the passageway 21 and flows there through, the thermal oil P cools slightly and is returned via a return line 68 to the heat exchanger 60 where the incoming exhaust gas G heats the thermal oil P. As an alternative, and in dependence on the temperature adjustment and actual temperature, the temperature controller 64 may control the flow of thermal oil O in such a way that the thermal oil Q sidesteps the heat exchanger 60 and flows via a bypass line 70 back to the feed line 66.

As further shown in the FIGURE, the electric generator 56 feeds electric energy via power lines 72 to the public power grid which is symbolized here by a power pole 74. Of course, the power lines 72 may also be electrically connected to a different consumer.

According to the present invention, the apparatus for fuel production is thus able to produce fuel and/or energy from the plastic components with biocatalyst as starting substances, which together form the catalytically active waste plastic mixture P. This is realized while reducing mass at the same time. As a result, the apparatus is operative in the absence of addition of external catalysts.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of recycling plastic comprising the steps of:
   comminuting waste plastic together with about 25-30% by weight of biocatalyst selected from the group of rice husks, rapeseed roots, rapeseed straw and sugar beets to form a catalytically active waste plastic mixture;
   subjecting the catalytically active waste plastics mixture to ultrasound and feeding the ultrasound treated catalytically active waste plastics mixture via an intermediate tank into a receiving tank;
   heating the ultrasound treated catalytically active waste plastic mixture in the receiving tank to a cracking temperature to undergo a cracking reaction;
   transferring a resulting waste plastic mixture to a mixer pump as a reaction mixture;
   directing the reaction mixture into an outgassing chamber of the intermediate tank to produce an outgassed fraction and a non-outgassed liquid fraction;
   cooling down the outgassed fraction to produce fuel;
   returning a first portion of the non-outgassed liquid fraction and subjecting it to the cracking temperature in the receiving tank;
   conducting a second portion of the non-outgassed liquid fraction in a bypass to the outgassing chamber of the intermediate tank for outgassing while fresh waste plastic mixture is added to the intermediate tank; and
   periodically removing settled residual matter from the intermediate tank.

2. The method of claim 1, wherein the transferring step includes the step of subjecting the resulting waste plastic mixture to a further cracking reaction in the mixer pump.

3. The method of claim 1, wherein the cracking temperature is in a range of about 280° C. to about 360° C.

4. The method of claim 1, further comprising the step of dewatering the fuel.

5. The method of claim 1, further comprising the steps of combusting the fuel in a turbine, and utilizing exhaust gas from the turbine for generating the cracking temperature.

6. The method of claim 5, wherein the exhaust gas of the turbine is used for drying the fresh waste plastic mixture.

7. The method of claim 5, wherein the exhaust gas of the turbine is used for heat introduction in a thermal oil circulation which produces the cracking temperature.

8. The method of claim 1, wherein the biocatalyst is rice husks.

9. The method of claim 1, further comprising the step of heating the second portion of the non-outgassed liquid fraction.

\* \* \* \* \*